United States Patent [19]

Belli

[11] Patent Number: 4,636,914

[45] Date of Patent: Jan. 13, 1987

[54] OUTLET BOX WITH REMOVABLE SELF-CONTAINED DEVICE

[75] Inventor: Andrea Belli, Brescia, Italy

[73] Assignee: AVE S.p.A., Italy

[21] Appl. No.: 675,944

[22] Filed: Nov. 28, 1984

[51] Int. Cl.$^4$ .............................................. H01H 9/02
[52] U.S. Cl. ..................................... 361/331; 174/53; 200/297
[58] Field of Search .......................... 361/331; 315/86; 307/66; 362/20; 174/53, 54, 66; 200/294, 296, 297

[56] References Cited

U.S. PATENT DOCUMENTS 2,934,590  4/1960  Thompson et al. .............. 174/66 X
4,001,803  1/1977  Lombardo et al. ............... 362/20 X

FOREIGN PATENT DOCUMENTS 852752  11/1969  Italy .

Primary Examiner—A. D. Pellinen
Assistant Examiner—Morris Ginsburg
Attorney, Agent, or Firm—McGlew and Tuttle

[57] ABSTRACT

The invention concerns an electrical device having a modular configuration which permits the assembly thereof with other electrical accessories, such as switches, outlets and the like, within receptacles common thereto or within outlet boxes or wall plates. This device, which may be, for instance, a flashlight with a rechargeable battery incorporated therein, rechargeable by means of the electrical network, is removable from the receptacle or outlet box so as to render it portable and utilizable also independently of the other electrical accessories.

6 Claims, 8 Drawing Figures

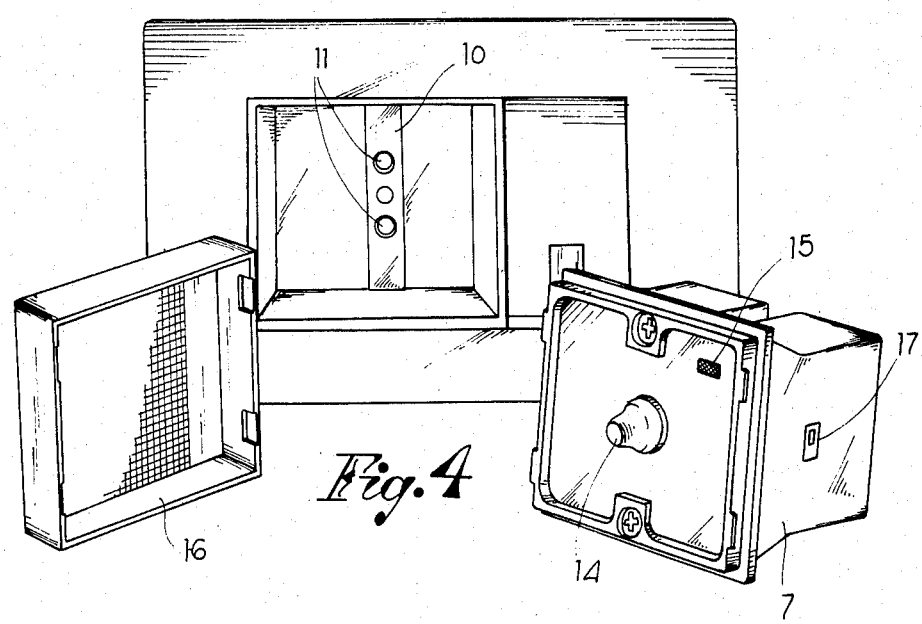
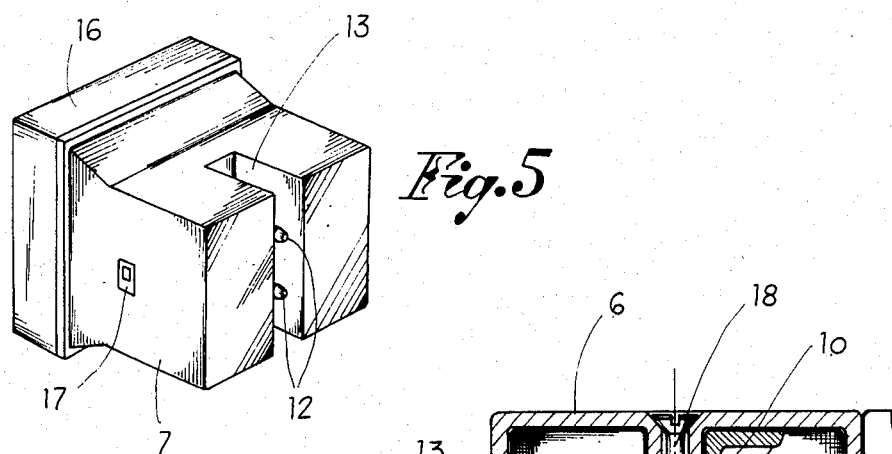
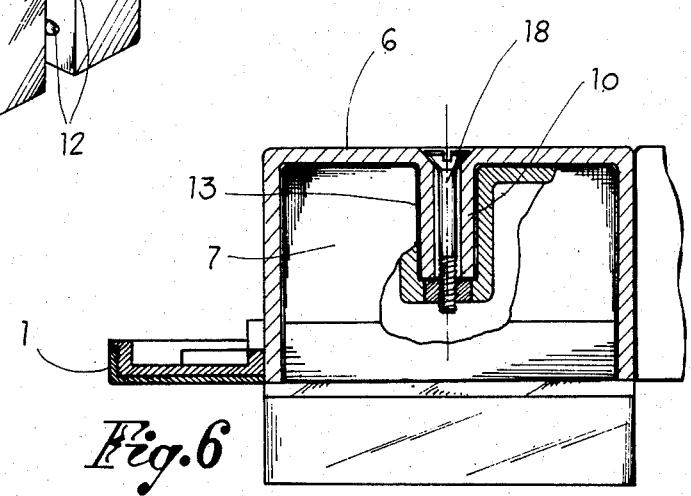

OUTLET BOX WITH REMOVABLE SELF-CONTAINED DEVICE

BACKGROUND OF THE INVENTION

In the field of electrical devices, already available are various devices shaped as modular components and, thus, interchangeable, to be snapped into position in receptacles, outlet boxes or wall plates of the type normally employed in household electrical wiring systems and, generally, in constructions of the residential type. Similar devices of various kind are the object of a previous Italian patent of Nov. 15, 1969 and can be of multiple dimension with respect to the base module for conventional accessories, such as wall switches, sockets and the like; they may be mounted side by side with these accessories in the windows of common receptacles for a perfect harmonization of the installation.

In any event, these electrical devices remain operative as long as they are connected to the electrical network and are mounted in the receptacle or in the outlet box. Accordingly, once they are detached from the electrical network and from the receptacle or outlet box, they become useless, because they are no longer suitable of employment in some other auxiliary function, complementary or of emergency.

DESCRIPTION OF THE INVENTION

The present invention is directed, instead, to an electrical device to be assembled with other modular components within receptacles or outlet boxes or wall plates, and removable or detachable from these receptacles, so as to become a portable and self-operating device. This electrical device may be a flashlight with rechargeable battery.

It is therefore an object of the invention to provide for an electrical device employable in residential electrical wiring systems and in constructions of the residential type, which device includes or comprises beside modular series components, such as switches, outlets and the like, and in a receptacle common therewith, a detachable device for auxiliary uses, complementary and emergency employment.

It is another object of the invention to provide for an electrical device composed of two member parts, of which one is fixedly attached to the receptacle or outlet box, just like a conventional modular component, and the other, that is the operative one, seated within the first part of the device, as an accessory to the accessory, and readily removable for the autonomous employment thereof, exploiting the principle of the so-called "Chinese Box".

A purely illustrative and not limitative example of the practical realization of the invention will be described hereinafter, with reference to the accompanying drawings.

BRIEF DESCRIPTION OF THE DRAWINGS

FIG. 4 shows the removable part removed from the device and with its frontal screen disassembled;

FIG. 5 shows the individual electrical device as a portable unit for its autonomous employment;

FIG. 6 is a sectional view of a detail for the possible attachment of the removable part of the device;

Figure 1:
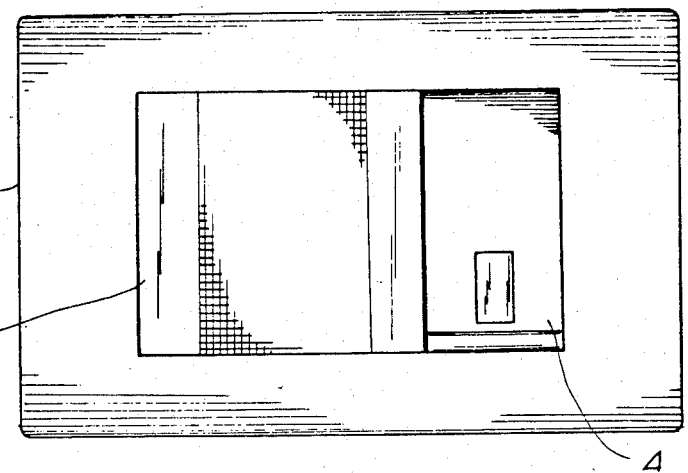
FIG. 1 is a front elevation of an electrical device that comprises a conventional modular accessory and a removable device in accordance with the invention.
Figure 7:
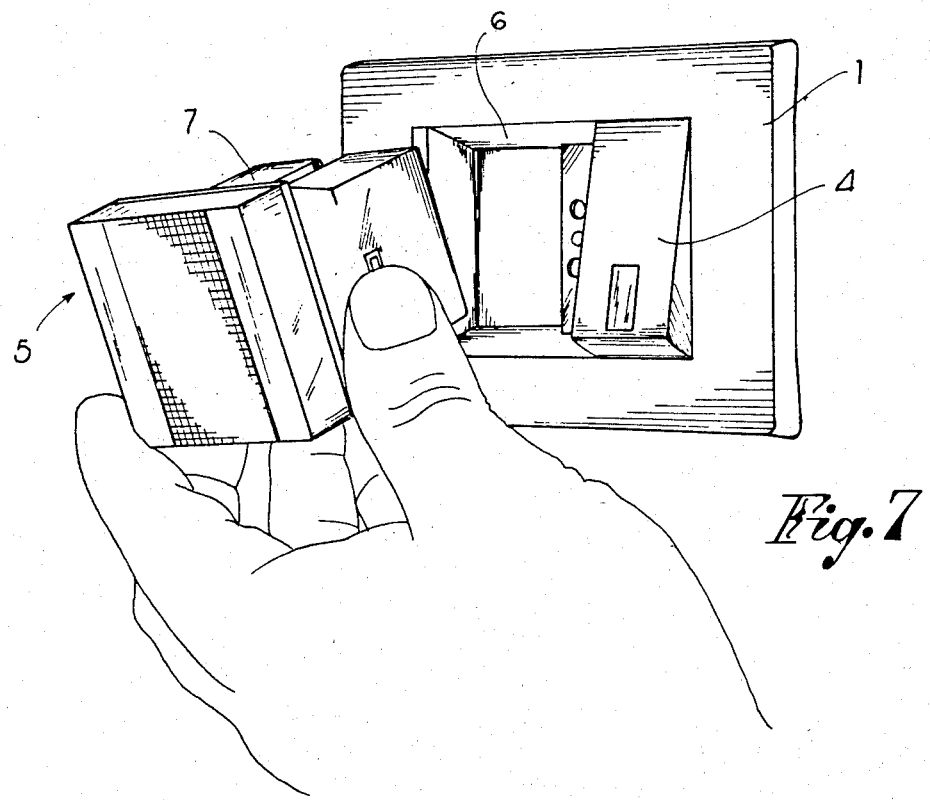
FIG. 7 shows the manual removal of the device.
Figure 8:
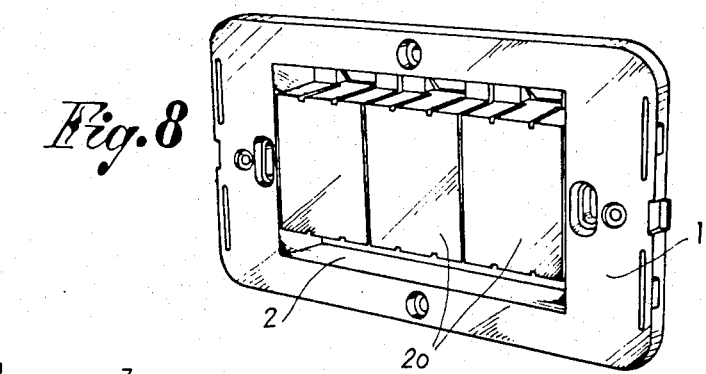
FIG. 8 shows an example of receptacle or outlet box used to receive a common electrical accessory and a removable device.
Figure 2:
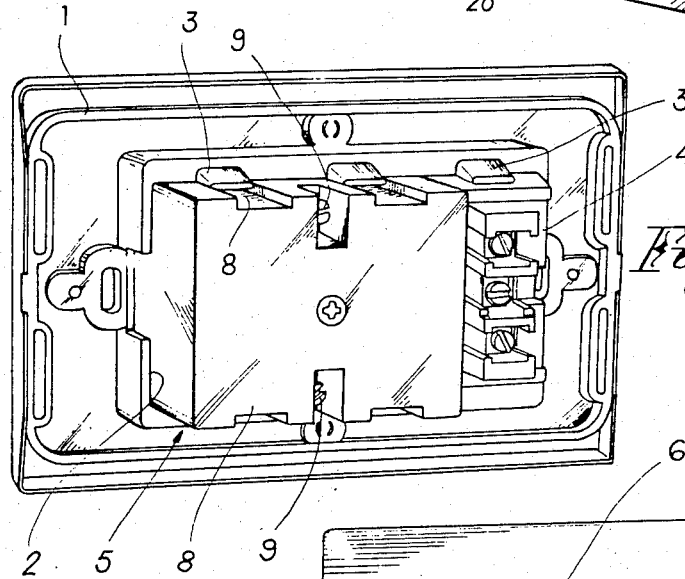
FIG. 2 is a perspective view of the back of the same device.
Figure 3:
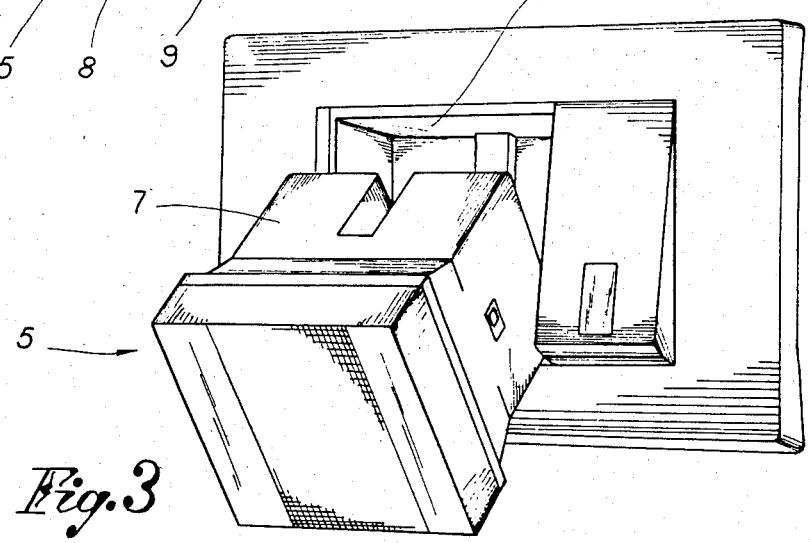
FIG. 3 shows the device with the electrical device of the invention in phase of detachment.

Referring to the drawings, in particular, the invention embodied therein comprises a removable supplementary electrical device generally designated 5, useable in an opening or a knock-out window 2 of an outlet box 1. The outlet box has a box-like body 6 which forms a space in the outlet box accessible through window 2 after one or more of the knockouts 20 are removed. According to the invention, with the right-most 20 as shown in FIG. 8, removed, a permanent accessory 4 as shown in FIG. 1 is inserted into the space. Permanent accessory 4 is of conventional type and may be an electrical jack terminal, switch, or pushbutton. The term "permanent accessory" is meant to mean such an accessory which is to be connected permanently into the outlet box 1 for normal use in the box. The removable supplementary electrical device 5 carries a box-like portable electrical device 7 which may, for example, be a rechargeable flashlight structure or the like. The portable electrical device 7 has a pair of jacks or plugs shown at 12 in FIG. 5 which are plugged into jack openings 11 in the body shown in FIG. 4. Terminals 9 shown in FIG. 2 extend from the back of box-like body 6 and are connected to the electrical network of a building in which the outlet box 1 is provided. These are electrically connected to the jack opening 11 so that with the device 7 plugged into its box-like body 6, its jacks 11 are electrically connected to the network of the building.

In the accompanying drawings, numeral 1 represents generally a receptacle or outlet box, which at the beginning has, within a window 2, a number of knock-outs 20 (see FIG. 8), each knock-out occupying a portion of the window corresponding to the modular dimensions of conventional electrical accessories, such as switches, outlets and the like. The removal of the knock-outs 20 permits the insertion of the accessories or of other components having multiple modular dimensions. The modular components are attached to snap holding means provided within the window 2.

In the illustrative example of FIGS. 1–7 of the drawings, in the window 2 of the receptacle or outlet box, after the removal of all the knock-outs 20, are mounted a conventional electrical accessory 4, such as a switch, a jack terminal, a push button, an alarm, etc., and a supplementary electrical device 5 positioned side by side with the electrical accessory 4, the supplementary device having a width twice as big as that of the accessory 4.

The supplementary device 5 plugs into a box-like body 6 to be attached fixedly to the receptacle or outlet box 1 and a member 7 seated within the box-like body and frontally removable from it.

In greater detail, the box-like body 6 is provided, externally, with blocking means 8 which mate with the snap holding means 3 on the receptacle or outlet box 1 and permit, therefore, the attachment of the body itself to the receptacle, as if it were a normal accessory 4. On the other hand, the removable member 7 is seated within the body 6, as an accessory to the accessory, and it could e.g. constitute a flashlight or other useful device.

On the back of the box-like body 6 there are mounted terminals 9 for connection to the electrical network, and inside the body 6 at the base thereof, there is provided a rib 10 with openings 11 for jack-type or plug-type coupling.

In the removable member 7 is enclosed an electrical circuitry (not shown) suitable to operate the electrical device as predetermined. When the removable member is seated within the box-like body 6, it is connected to the network by means of two jacks 12 which are inserted in the openings 11 in correspondence with a rib 10. The jacks 12 terminates in a cavity 13 provided on the back of the member 7. The cavity 13 is then intended to mate with the rib 10 of the box-like body 6.

In the case of a flashlight, the electrical member 7 is provided frontally with a light bulb 14 (see FIG. 4) as well as with a warning light 15, which indicates the presence of electric current in the network, both lights 14 and 15 being protected by a removable transparent screen 16.

The circuitry of such an electrical device comprises, in turn, a rechargeable battery to be fed by the network current, means for preventing the total discharge of the battery, in the event of prolonged outages, and means for activating automatically the device, or its bulb 14, in case of a current loss.

The charged condition of the battery is indicated by the warning light 15 and on the side of the device there may be provided a switch or push button 17 of the on-off variety for the employment of the device as an independent unit, when separated from the box-like body 6.

Practically, when the member 7 is positioned in the box-like body 6 (see FIG. 1) it is aesthetically harmonized with the other modular components 4 mounted on the same receptacle, and it is utilizable as emergency lamp with automatic energization, in the event of an outage, or by means of a suitable light bulb, as a useful night light.

When detached from the box-like body 6 (see FIG. 5), the device becomes portable and self-operative. It is now energized by the battery and may be turned on and off at will by actuating the switch or push button 17.

It is to be observed that the replacement of the light bulb may be effected only when the member 7 is detached from the network and from the box-like body 6, thus in a condition of maximum safety. Only under these conditions it is possible in fact to detach the front screen in order to reach the light bulb.

Furthermore, when it is required to prevent the theft or the unauthorized removal of the device, member 7 may be fixed and immobilized onto the box-like body by means of a screw 18, mounted in correspondence with the rib 10 and attaching the back of the device, as shown, for instance, in FIG. 6 of the accompanying drawings.

The supplementary device 7 could be a device different from a flashlight, described hereabove, without leaving the scope and purpose of the invention.

I claim:

1. An electrical device comprising an outlet box having a front window, a plurality of snap holding means around said window for holding a plurality of structures in said window, a box-like body extending in said window and engaged with at least one of said snap holding means for holding said body in said window, said box-like body defining an inner space accessible through said window, a permanent electrical accessory extending in said window and engaged with one of said snap-holding means adjacent said box-like body, said snap-holding means engaged with said permanent accessory being separate from said snap-holding means engaged with said body, said body including a plurality of electrical connecting openings in said space for receiving electrical jacks, a portable supplementary electrical device inserted into said space of said body, said supplementary device having a plurality of electrical jacks each engaged in one of said electrical connecting openings of said body, said supplementary device substantially filling said space of said body and being positioned adjacent said permanent accessory.

2. An electrical device according to claim 1, wherein said outlet box includes a plurality of knock-out portions extending over said window, at least one knock-out portion being removable for receiving one of said permanent accessory and said supplementary device, said box-like body including an outer surface outside of said space, an electrical connection means extending from said outer surface and being electrically connected to said electrical connecting openings.

3. An electrical device according to claim 1, wherein said box-like body has an outer surface outside of said space and includes electrical connection means extending from said outer surface and electrically connected to said electrical connecting openings, said supplementary device having an outer configuration substantially conforming to an inner configuration of said space.

4. An electrical device according to claim 3, wherein said body includes a rib in said space containing said electrical connecting openings, said supplementary device having a cavity conforming in shape to said rib, said jacks extending in said cavity and said cavity embracing said rib when said supplementary device is disposed in said space of said body.

5. An electrical device according to claim 4, wherein said supplementary device comprises a portable rechargeable flash light, said supplementary device having a front face extending in said window of said outlet box, a light bulb extending outwardly from said front face and a push button electrically connected to said light bulb.

6. An electrical device according to claim 3, wherein said window of said outlet box is divided into three side-by-side portions, said outlet box having a snap-holding means for each of said portions of said window, said permanent accessory being connected to said snap-holding means at one end of said window and filling said portion of said window thereat, a remaining two portions of said window being filled by said body and being engaged by said snap-holding means of said remaining two portions of said window.

* * * * *